United States Patent [19]

Pastor et al.

[11] 4,011,586
[45] Mar. 8, 1977

[54] VOICE LOGGING RECORDER FOR USE WITH PRELOADED CASSETTES

[75] Inventors: Sheldon Lee Pastor, St. Paul, Minn.; Dan J. Argento, Thousand Oaks, Calif.

[73] Assignee: Minnesota Mining and Manufacturing Company, St. Paul, Minn.

[22] Filed: Nov. 28, 1975

[21] Appl. No.: 635,872

[52] U.S. Cl. .................................. 360/61; 360/31
[51] Int. Cl.² .................... G11B 5/12; G11B 27/36
[58] Field of Search ..................... 360/31, 61, 63

[56] References Cited
UNITED STATES PATENTS

| | | | |
|---|---|---|---|
| 3,576,573 | 4/1971 | Symons | 360/63 |
| 3,643,243 | 2/1972 | Johnson et al. | 360/63 |
| 3,965,484 | 6/1976 | Marz et al. | 360/31 |

Primary Examiner—Vincent P. Canney
Attorney, Agent, or Firm—Alexander, Sell, Steldt & DeLaHunt

[57] ABSTRACT

A voice actuated voice logging recorder adapted to use magnetic recording tape in preloaded magazines includes a logging deck having a transport mechanism, means responsive to an input signal corresponding to voice data for enabling the transport mechanism to switch to a run position and a verification network which is activated upon insertion of a magazine into the deck. The verification network is particularly desirable to overcome limitations in the reliability of typical cassette recorders, and includes a network for rewinding the tape to ensure that all of the tape is on a rewind spool and that the tape is not bound. A second network repositions the rewound tape to enable recording onto the tape and a test recording is then produced to ensure that the tape is properly oriented, i.e., that the tape has not become twisted within the magazine. In a preferred embodiment, a second logging deck is provided, which deck may be automatically activated in the event additional detectors indicate that a faulty recording is being produced by the first deck.

8 Claims, 3 Drawing Figures

VOICE LOGGING RECORDER FOR USE WITH PRELOADED CASSETTES

CROSS REFERENCE TO RELATED APPLICATION

This application relates to a copending application filed the same day herewith, in which a tape cassette drive apparatus preferably utilized in a data logging recorder such as that of the present invention is disclosed and claimed in Ser. No. 636,320.

BACKGROUND OF THE INVENTION

1. Field of the Invention

This invention relates to magnetic tape recorders, especially to those designed for use in continuous duty, data logging applications.

2. Description of the Prior Art

Voice-activated, voice logging recorders are widely used in monitoring police, fire and aircraft communications and business and government meetings. Typically, such recorders have utilized reel-to-reel tape decks generally installed in pairs so that the second deck starts automatically in the event the first deck becomes inoperative.

The convenience of tape decks adapted to use magnetic recording tape preloaded in magazines such as the popular "Philips" type cassettes has resulted in such decks dominating the audio recorder market. This convenience, particularly as it relates to compactness, ease of loading, ready storage, and identification of contents would make it desirable to use preloaded magazines or cassettes in voice logging recorders as well.

However, typical cassette recorders lack the reliability which is mandatory in voice logging recorders where the loss of any data cannot be tolerated. While many improvements are being made to enhance their reliability, both in the cassettes themselves and in the associated drive mechanisms, semi-reliable audio cassette recorders have not been considered to be acceptable for voice logging operations. This is due to the fact that the tape in such cassettes is not readily evident, such that an operator may insert a cassette without determining whether the tape is fully rewound onto the supply spool or whether a leader portion is exposed. Similarly, the tape within the cassette may become twisted such that the oxide layer is facing the wrong direction.

Typically, the operator does not know that a recording has been made until replay is attempted at a later time, at which time it is too late to correct an inoperative condition such that incoming data may thus be permanently lost.

SUMMARY OF THE INVENTION

The present invention employs a semi-reliable magazine or cassette recorder which, common to ordinary cassette recorders, has a standby mode position at which a cassette is positioned to enable the tape to be transported at high speed and a run mode position at which the tape is transported at uniform speed. As in ordinary voice logging recorders, the novel recorder includes a network for generating an input signal indicative of voice data and for thereupon enabling the deck to be switched to the run mode position.

The novel recorder attains the reliability required for voice logging by virtue of a verification network which is activated upon the insertion of a cassette into the deck. The network includes a mechanism for rewinding the tape and for producing a tape-advance signal upon completion of the rewind operation. A tape-advancing mechanism positions the rewound tape for recording and for thereupon producing a test-enable signal. A network responsive to the test-enable signal for recording and playing back signals produces an operate signal in response to the playback to verify that the deck and the tape therein is operative. The deck further includes means for switching the deck into the standby mode position in response to the operate signal and into the run mode position in response to an input signal to record the voice data, together with a network for automatically activating a failure mechanism upon the absence of any of the advance, test record or operate signals. The absence of failure gives assurance that incoming voice data will be recorded.

In a preferred embodiment, the cassette carries an opaque magnetic recording tape and transparent non-magnetizable leader. The rewind mechanism includes an optical sensor for detecting the leader portion to deactivate the rewinding and to produce the tape-advance signal. Upon forward tape movement, the same or a second optical sensor detects the presence of the opaque tape, produces the test-enable signal and thereupon initiates the operation of the recording and playing back network. The magnetic record/playback transducers thereupon record and play back a test pattern which is compared against a known value. The operate signal is produced when the comparison is indicative of an acceptable recorded test pattern.

To obtain further assurance against failure while voice data is being logged, the deck includes a network for playing back the recorded voice portion of the voice data concurrently with the recording thereof and for comparing the two to produce an error signal in the event the comparison indicates a faulty recording. A second logging deck is preferably provided, having a transport mechanism, an input signal generating network and a verification network as in the first deck. The second deck includes a circuit for holding that deck in its standby mode position, which circuit in response to the error signal switches the second deck to its run mode position to initiate recording the voice data.

DESCRIPTION OF THE PREFERRED EMBODIMENT

Figure 1:
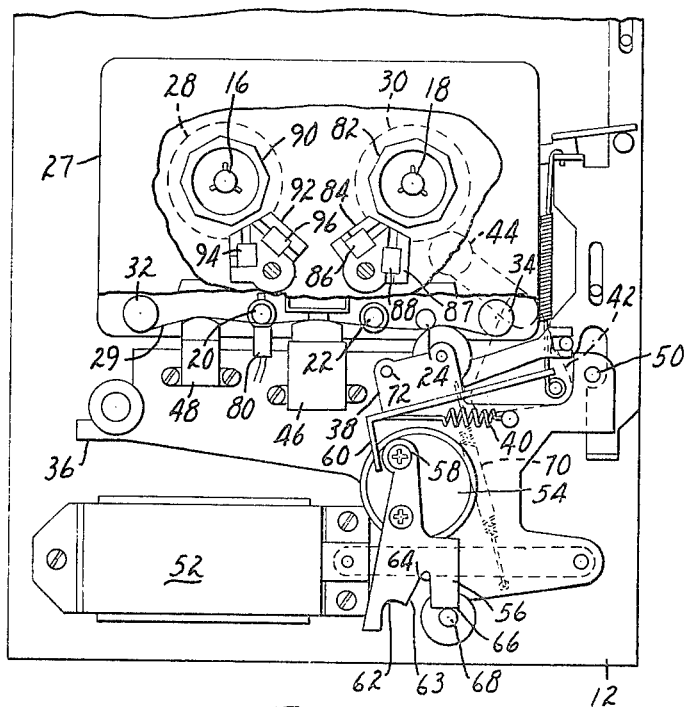
FIG. 1 is a cut-away top view of a preferred embodiment of the logging deck of the present invention.

In the preferred embodiment of the present invention, the voice logging recorder includes a logging deck having a driving mechanism similar to that set forth in U.S. Pat. No. 3,542,312 (Erickson). A cut-away top view of such a mechanism is shown in FIG. 1. As may there be seen, the mechanism includes a frame 12 and a tape transport assembly mounted on the frame 12. The assembly includes spindles 16 and 18 for supporting a supply hub 28 and a take-up hub 30, positioning pins 20 and 22, a capstan 24 and a pressure roller 26. The assembly is adapted to receive a preloaded magazine such as a standard "Philips" type cassette 27 containing a magnetic recording tape 29 on the supply and take-up hubs 28 and 30 respectively. The tape 29 thus extends along a tape transport path extending from one side of the cassette 27 adjacent the guide 32 along the positioning pins 20 and 22, between the capstan 24 and pressure roller 26, around the guide 34 and thence onto the take-up hub 30. The assembly further provides means (not shown) for driving the spindles 16 and 18 and the capstan 24 in a conventional manner. The driving mechanism preferably further includes a movable carriage 36 which is mounted on the frame 12 on a pivot 50, such that the energization of the solenoids 52 and 54 enable the rotation of the carriage 36 so as to bring the erase and record/playback heads 48 and 46 respectively and the pressure roller 26 into contact with the tape 29. The carriage 36 is provided with a latching mechanism including the arm 56, which when moved, positions the detents 62, 64 and 66 against a stop member 68, and maintains the carriage and the members mounted thereon in either a standby position, at which the pressure roller is either in a stop or a pause mode position, and a run position. Various details of this transport mechanism are the invention of Messrs. Pastor, Erickson and Kahn and are disclosed and claimed in a copending patent application filed the same day herewith (File No. 29,720).

In addition to the transport mechanism, which enables the tape to be moved at high speed for rewind and fast forward operations and at a uniform speed for recording, the deck further includes a network for generating an input signal indicative of incoming voice data, which network further enables the deck to be switched to the run mode position in response to the input signal, together with a verification network which is activated upon insertion of a magazine into the deck.

The details of the switching and verification networks are set forth in detail hereinbelow; however, with reference to FIG. 1, it should be noted that the deck is provided with various sensors for detecting the operability of the deck and a magazine such as a standard "Philips" type cassette loaded therein. A first of such sensors includes a photocell 80 which is mounted opposite the positioning pin 20. The positioning pin is provided with a hollow interior and an opening in the side thereof facing the tape transport path such that light from a minute light source positioned within the pin 20 may shine through an opening and onto the photocell 80 so long as the light is not obscured by the presence of the opaque recording tape 29. Thus, the presence of a transparent leader or trailer associated with the tape 29 or the opaque tape itself may be conveniently detected and a signal from the photocell 80 thus used to activate further operations. The take-up spindle 18 is provided with a multi-faceted mirror 82, which together with a photocell/light source combination 84 form a tachometer enabling the determination of the speed of the take-up spindle 18. The combination 84 comprises a housing 87 within which are positioned a minute light source 86 and a photocell 88. The housing 87 is provided with an opening adjacent the mirror 82 such that light from the light source 86 is reflected off the mirror surfaces and onto the photocell 88. The frequency of the alternating signal produced by the photocell 88 is proportional to the absolute speed of the take-up reel and may also be used to indicate motion of the take-up spindle itself. Thus, if the take-up hub 30 should become jammed or for whatever the reason the tape not be rewound, such an occurrence would be detected by the absence of an alternating signal from the photocell 88.

The supply spindle 16 is desirably also equipped with a similar multi-faceted mirror 90 and light source/photocell combination 92. The assembly 92 includes a minute light source 94 and a photocell 96. This combination enables the detection of the speed of the supply hub 28. Since the rotation speed is a function of the amount of tape left on the hub 28, the signal from the photocell 96 may be used to provide an early indication of the presence of less than a predetermined amount of tape remaining on the supply hub 28. Such a signal is desirably utilized to delay the recording of voice data until a suitable cassette is fully positioned for recording and to postpone the auto-rewind function until the end of an incoming message.

Figure 2:
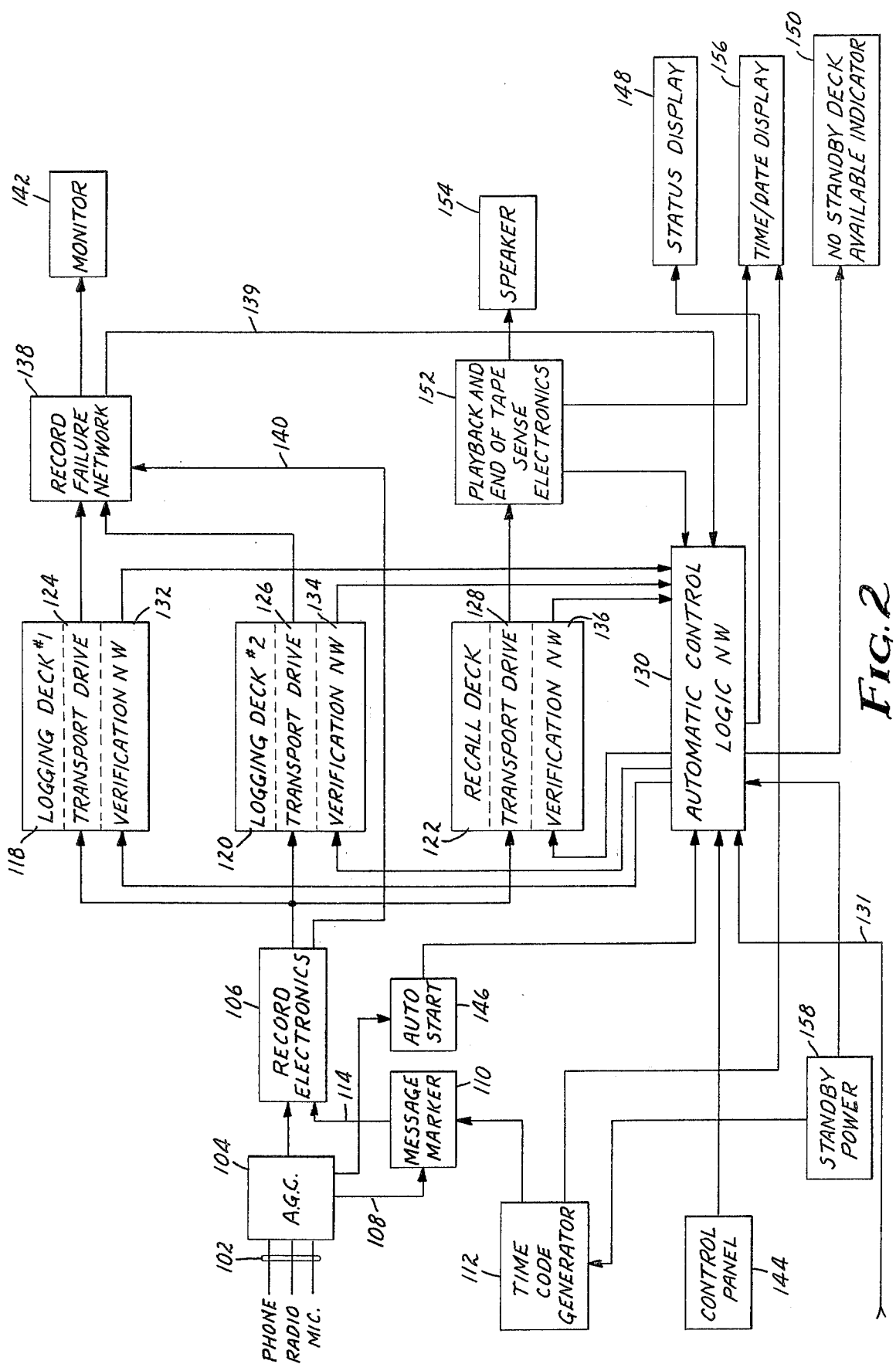
FIG. 2 is a block diagram of a preferred embodiment of the logging recorder of the present invention.

A block diagram of a preferred embodiment of the voice logging recorder of the present invention is shown in FIG. 2. As is there set forth, the recorder is adapted to receive voice data such as that provided from telephone lines, radio or microphone outputs on leads 102. While the recorder of the present invention is primarily directed to recording audio information, the term "voice data" as used herein is also intended to include all types of data, be it human voice, instrumental, electronic, teletype, etc. These signals are coupled through an automatic gain control (AGC) circuit 104 to normalize the level of the input signals. The output of the AGC circuit 104 is coupled to the record electronic circuit 106 which amplifies the signals and adds the record bias signal in a conventional manner. The AGC circuit 104 also provides an input signal pulse on lead 108 which is coupled to a message marker switch circuit 110 in order to provide a time burst signal indicative of the beginning of each message.

Inasmuch as logging recorders of necessity require recording information as to the time at which the data to be recorded was received, a time code generator 112 is provided. The output from the generator 112 is coupled to the message marker switch circuit 110, wherein the time code signal from generator 112 is interrupted by the message marker signal. The time-shared time code and message marker signal is coupled on lead 114 to the record electronics circuit 106 wherein the bias signal is added to provide the composite record signal applied to the time track record heads in the respective decks. The record circuits 106 thus provide signals suitable to drive both the voice data and time data record heads of the respective tape decks.

The recorder of the present invention preferably includes three tape decks 118, 120 and 122 respectively. Additional decks may also be included if desired to extend the recording capability. Two of the decks, 118 and 120 respectively, are dedicated to voice logging operations, while the third deck 122 is dedicated to data recall operations. The decks 118, 120 and 122 each include a transport drive mechanism 124, 126 and 128 respectively, such as that described in conjunction with FIG. 1, which mechanism may be switched between a run mode position, a pause mode position and a stop mode position by the appropriate energization of the solenoids 52 and 54 of each deck. Preferably, each deck is electrically actuatable by control signals from an automatic control logic network 130. If additional decks are provided, control signals therefrom are coupled to the network 130 via lead 131. Each deck also includes a verification network 132, 134 and 136 respectively. Each of these networks are activated upon the insertion of a cassette into a given deck and ensure the operability thereof. Details of the verification networks are set forth in FIG. 3.

The outputs of the voice and time data playback heads (46 of FIG. 1) within the logging decks 118 and 120 are coupled to a record failure network 138. This network monitors the operation of the decks during actual recording operations and produces an error signal on lead 139 to the automatic control logic 130 in the event any of a variety of failures have occurred such that data is not being properly logged onto the deck then in operation. As is set forth in more detail in FIG. 3, the record failure network 138 includes the tachometer comprised of the mirror 82 and the photocell/light source assembly 84 (FIG. 1) which provides an indication of the end of the tape (i.e., by sensing the presence of a transparent trailer) and a circuit for comparing the playback signal with the input signal on lead 140 to provide an indication of other failures preventing proper recording. The playback signal is also coupled to a monitor jack 142 which enables manual verification of the recorded signal. Due to the processing of the signals within the recorder, such a playback signal is typically produced with an approximately 150 millisecond delay after the occurrence of the corresponding input signal.

The automatic control logic network 130 provides the overall control of the recorder. This network is responsive to appropriate signals from a control panel 144 to allow manual switching between continuous record and voice actuated record modes. The panel 144 also provides signals enabling the switching of the recall deck 122 between record, stop, play, fast foward and rewind modes. Additional controls on the panel 144 enable the recall deck to be automatically rewound to recall a given message and to be automatically readvanced to the end of the last recorded message and to reinitiate recording of newly received voice data thereon.

The control logic network 130 is also responsive to an auto-start signal enabling voice actuation of the respective decks. Such a signal is provided by an auto-start circuit 146 which responds to a signal from the AGC circuit 104 indicative of the presence of a message, and thereby activates and deactivates the control logic upon the beginning and end of each message.

The error signal on lead 139 is operated by the control logic network 130 as a transfer signal to provide appropriate control signals to the respective decks, thereby switching a second deck into an on-line condition in the event an error signal is received indicating inoperability in the then on-line deck.

The control network 130 also responds to the verification networks 132, 134 and 136 respectively, to provide failure indication signals or standby signals as appropriate. Thus, outputs are provided to a status display 148 to indicate the mode position of each of the decks and to a no-deck-available indicator 150 to indicate that an error signal has been received from one of the logging decks and that the other logging deck is also inoperative.

The automatic control logic network 130 is desirably adapted to switch the on-line deck into its pause mode position at the end of a given message. To ensure that a momentary pause during a message does not result in switching the deck, the network 130 is preferably constructed to respond to a period of approximately 5 seconds of continuous quiet (absence of voice data) before producing a switch-to-pause-mode signal.

The playback heads of the recall deck 122 are coupled to a playback signal processor network 152. The retrieved voice data is then coupled to an appropriate output such as speaker 154. The time code data is coupled through an appropriate override switching circuit in the time/date display 156 to thus display the time at which data being retrieved was recorded. A signal from the time code generator 112 is also coupled to the display 156 to enable display of the real time when the recall deck is not in its playback mode.

The voice logging recorder of the present invention is designed for use in high reliability applications. Accordingly, it is important to minimize conditions under which faulty recording will occur. Thus, while the recorder is dependent upon conventional power supplies for full operation, a standby power supply 158 is desirable to provide power to the time code generator 112 and the control logic network 130. This ensures that despite power interruptions the time code will be accurate and that the logic functions dictating the mode in which the various portions of the recorder are operating are maintained.

Figure 3:
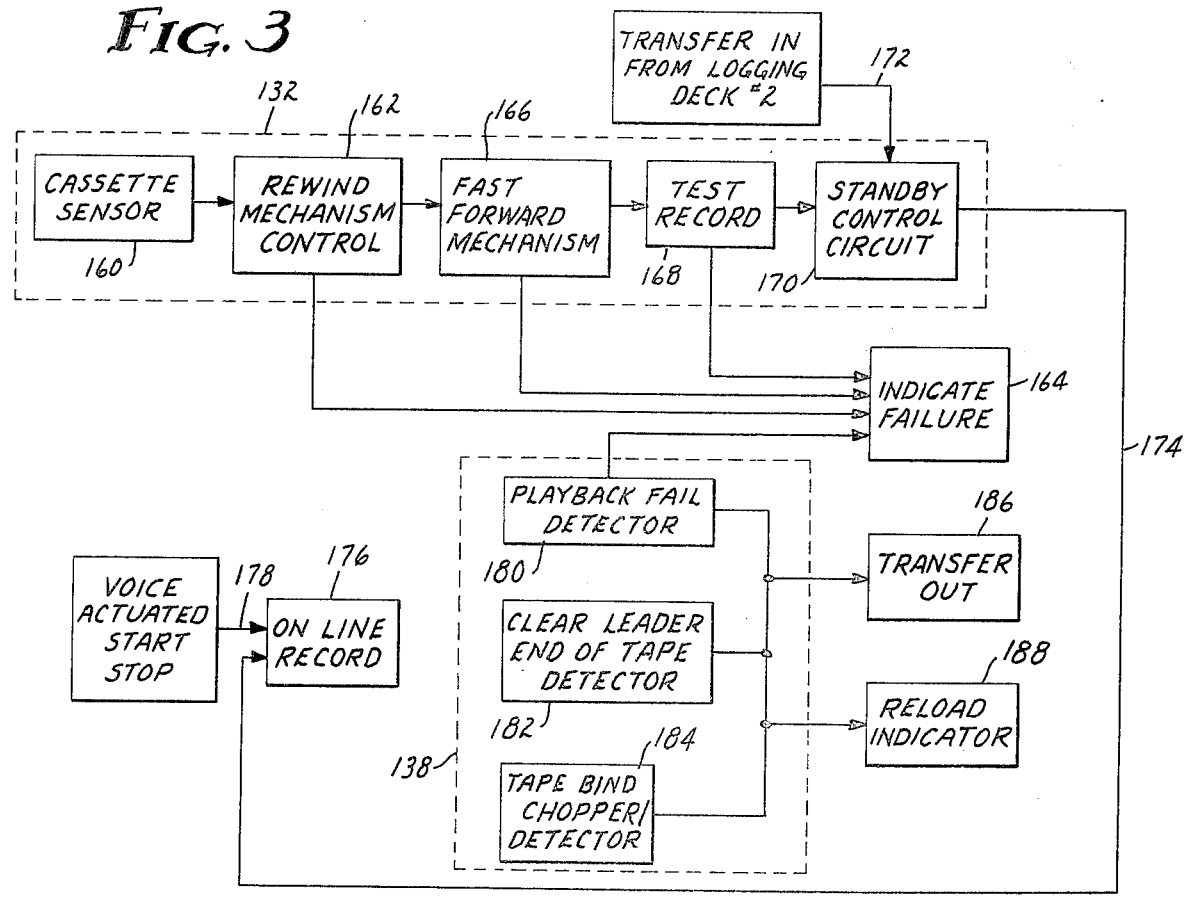
FIG. 3 is a more detailed block diagram of various portions of the embodiment shown in FIG. 2.

Referring now to FIG. 3, a verification network such as the network 132 of the first logging deck 118 is shown to first include a cassette sensor 160. This sensor, such as an appropriately positioned sensing switch on the transport assembly is activated upon insertion of a cassette into the deck and thereupon initiates the verification operation. The cassette sensor 160 is coupled to a rewind mechanism control 162 which automatically rewinds the tape until deactivated by the presence of a transparent leader adjacent the photocell 80 (FIG. 1). In an alternative embodiment, such termination could likewise be provided by sensing a maximum rate of revolution of the take-up spool 30 with the tachometer 82–84. In the event the tape is bound so as not to be free to move, a failure signal is provided to the failure indicator 164, thus alerting an operator of the need to insert another cassette. The aforementioned deactivation also produces a tape-advance signal which energizes a fast forward mechanism 166 to advance the tape until the magnetic oxide is adjacent the record/-playback head 46. Such positioning, as may be sensed by the opaque recording layer blocking light in the photocell 80 produces a test-record signal. In the event the mechanism is unable to so position the tape, a failure signal will again activate the failure indicator 164.

The test-record signal in turn activates the test record network 168, which network includes the record and playback head 46. Such a head is desirably constructed to include two separate windings and magnetic fields such that recording and playback operations may proceed simultaneously. With such a head, a short test signal may be both recorded onto the tape and played back. The playback signal is then compared against a known value to determine that the tape is recordable. Particularly with long playing cassettes, the extremely thin tape substrates there employed tend to allow tapes to twist such that the wrong side of the tape is adjacent the head. The network 168 thus ensures the proper orientation of the tape and produces an error signal to the error indicator 164 if no verification is determined. If a properly recorded test signal is determined to be present, an operate signal is produced, verifying that the deck and tape thereof are operational. This signal activates a standby circuit 170 which holds the deck in the pause mode position such that the presence of a transfer-in signal on lead 172 results in the production of a signal on lead 174 to activate an on-line circuit 176, thereby switching the deck to receive voice actuated start/stop signals on lead 178. The presence of such signals thus rapidly switch the deck from its pause mode position to its run mode position.

In a preferred embodiment, the test signal comprises approximately a one second test recording of the time code. The playback signal may then be simply compared to determine the presence of some signal inasmuch as the primary concern at that stage is simply whether the tape is properly oriented.

As discussed hereinabove, the record failure network 138 includes three provisions for ensuring the operability of the on-line logging deck. A playback failure detector 180 includes a comparator circuit which receives both the incoming signal and the signal produced by the playback head and produces an error signal in the event the comparison indicates a lack of correspondence between the two. Such a circuit conveniently senses the difference between an incoming signal having one polarity and a playback signal of opposite polarity such that under proper conditions, the signals balance out. An unbalance condition then results in the error signal. A variety of comparison techniques may likewise be employed.

The end of tape detector 182 includes the photocell 80 (FIG. 1) and is responsive to a change in the output thereof corresponding to a transition from opaque tape to transparent leader. Such a transition likewise results in an error signal.

The tape bind detector 184 comprises the multifaceted mirror 82 and the associated photocell/light source assembly 84. The absence of an alternating signal from the photocell 88 thus indicates that the tape is not being wound or rewound and results in the production of an error signal.

An error signal from any of the three detectors is coupled to a transfer-out circuit 186, and thence to the automatic control logic network 130 to switch the other of the logging decks on-line, which also energize a reload indicator 188.

Having thus described the present invention, what is claimed is:

1. A voice logging recorder adapted to utilize magnetic recording tape in preloaded magazines having a logging deck comprising
   a. transport means having a standby mode position at which a magazine is positioned to enable the tape to be transported at high speed and a run mode position at which the tape is transported at uniform speed,
   b. means generating an input signal indicative of voice data and enabling switching to the run mode position in response to the input signal, and
   c. a verification network activated upon insertion of a magazine into the deck including
      i. means for rewinding the tape and for producing a tape-advance signal upon completion thereof,
      ii. means responsive to the tape-advance signal for advancing the rewound tape and for thereupon producing a test-enable signal,
      iii. means responsive to the test-enable signal for recording and playing back signals and for producing an operate signal in response to said playing back, verifying that the deck and tape thereof are operative,
      iv. means responsive to said operate signal for switching the deck into the standby mode position and into the run mode position in response to a said input signal to record said voice data, and
      v. means for automatically activating a failure mechanism upon the absence of any of said advance, test-enable and operate signals.

2. A voice logging recorder according to claim 1, wherein said magnetic recording tape has a nonmagnetizable leader and said rewinding means further comprises means for sensing the leader portion and means responsive thereto for deactivating the rewinding.

3. A voice logging recorder according to claim 2, wherein the tape is opaque and the leader is transparent and further including means for optically sensing the presence of the opaque tape and for initiating the operation of said recording and playback means.

4. A voice logging recording according to claim 1, wherein said means for recording and playing back signals comprises a magnetic record transducer for recording a test pattern onto the tape, a playback transducer positioned adjacent the recording transducer for playing back the test pattern and for comparing the played back test pattern against a known value.

5. A voice logging recorder according to claim 1, wherein said means for recording and playing back signals further comprises means for playing back the recorded voice portion of the voice data concurrently with the recording thereof, means for comparing the playback voice portion with the input voice portion and means for producing an error signal in the event said comparing means indicates a faulty operation.

6. A voice logging recorder according to claim 5, further comprising a second logging tape deck including transport means, input signal generating means and verification means as in the first logging deck, means for holding the second logging deck in its standby mode position and responsive to said error signal for switching to its run mode position to initiate recording the voice data onto the tape of the second deck.

7. A voice logging recorder according to claim 6, further comprising means for sensing the end of tape within a magazine and for thereupon generating a said error signal for switching the second deck to its run mode position.

8. A voice logging recorder according to claim 6, further comprising means for sensing the speed of a supply spindle and for generating a signal indicative that less than a predetermined amount of tape remains on the supply hub.

* * * * *